United States Patent
Morgan et al.

(10) Patent No.: US 6,987,560 B2
(45) Date of Patent: Jan. 17, 2006

(54) INVERSE SYNTHETIC APERTURE RADAR-BASED COVERT SYSTEM FOR HUMAN IDENTIFICATION

(75) Inventors: Douglas P. Morgan, Auburn, WA (US); William P. Green, Shoreline, WA (US)

(73) Assignee: The Boeing Company, Seattle, WA (US)

(*) Notice: Subject to any disclaimer, the term of this patent is extended or adjusted under 35 U.S.C. 154(b) by 246 days.

(21) Appl. No.: 10/452,036

(22) Filed: May 30, 2003

(65) Prior Publication Data

US 2004/0239549 A1 Dec. 2, 2004

(51) Int. Cl.
G01C 3/08 (2006.01)
G01B 11/24 (2006.01)
G01B 11/30 (2006.01)

(52) U.S. Cl. ..................... 356/4.09; 356/603; 356/608
(58) Field of Classification Search ......... 356/4.01–4.1, 356/601–612; 342/25 A, 25 F
See application file for complete search history.

(56) References Cited

U.S. PATENT DOCUMENTS

| | | | |
|---|---|---|---|
| 4,657,394 A * | 4/1987 | Halioua | .................. 356/604 |
| 4,768,158 A | 8/1988 | Osanai | |
| 4,856,893 A | 8/1989 | Breen | |
| 4,932,775 A | 6/1990 | Wissman et al. | |
| 5,343,204 A | 8/1994 | Farmer et al. | |
| 5,512,899 A | 4/1996 | Osawa et al. | |
| 5,805,099 A | 9/1998 | Nagata | |
| 5,925,880 A | 7/1999 | Young et al. | |
| 6,014,099 A | 1/2000 | Bennett et al. | |
| 6,023,235 A | 2/2000 | Sauer | |
| 6,128,405 A * | 10/2000 | Fujii | .................. 382/154 |
| 6,255,981 B1 | 7/2001 | Samaniego | |
| 6,337,654 B1 * | 1/2002 | Richardson et al. | .......... 342/90 |
| 6,542,249 B1 * | 4/2003 | Kofman et al. | ............. 356/601 |
| 2001/0030754 A1 * | 10/2001 | Spina et al. | ................ 356/601 |

OTHER PUBLICATIONS

Jay F (1984). "Radar." In IEEE Standard Dictionary of Electrical and Electronics Terms (p. 716). New York, NY: The Institute of Electrical and Electronics Engineers, Inc.*
Y. Li et al., "Rapidly tunable millimeter–wave Optical transmitter for Lidar–Radar" Center for Microwave–Lightwave Engineering, Drexel University, Philadelphia, PA 19104, Motorola Broadband Communications Sector, Horsham PA pp. 1–21.
Hyunjun Kim et al., "High Resolution Ka–Band Images of a small Tree: Measurements and Models" IEEE Transactions on Geoscience and Remote Sensing, vol. 38, No. 2, Mar. 2000, pp. 899–910.

* cited by examiner

Primary Examiner—Bernarr E. Gregory
Assistant Examiner—Brian K Andrea
(74) Attorney, Agent, or Firm—Black Lowe & Graham, PLLC; Dale C. Barr

(57) ABSTRACT

A method, apparatus, and computer readable medium are provided for creating a quantitative, three-dimensional representation of a surface of a human subject. Data representing a physical appearance of a human subject is gathered using inverse synthetic aperture radar. A source signal is directed toward the human subject as the target rotates through a range of motion and a return signal is collected. The returned signal is transformed into a quantitative representation of the surface data. The quantitative representation can be added to an archive or can be checked against an archive to determine if the human target is indexed in the archive.

60 Claims, 4 Drawing Sheets

Fig. 2A  Fig. 2B

INVERSE SYNTHETIC APERTURE RADAR-BASED COVERT SYSTEM FOR HUMAN IDENTIFICATION

FIELD OF THE INVENTION

This invention relates generally to identifying a subject and, more specifically, to identifying a human subject.

BACKGROUND OF THE INVENTION

Security in a variety of settings, such as at national borders, at public events, and on mass transportation, is more of a concern than ever before. Atrocities have been committed all around the world in the past several years. Tragically, many of these tragedies were committed by known criminals or terrorists, and might have been prevented had the perpetrators been discovered entering the nation, arriving at the venue, or upon boarding the conveyance. Being able to identify undesired persons and deny them access to places or situations where they might do harm could be of tremendous benefit. Similarly, being able to identify desired persons seeking entry to secured facilities and denying access to all others would also be a tremendous security benefit.

Image or facial recognition might be used to detect perpetrators, but there are several concerns which limit the practicability of currently performing accurate recognition. First, the most accepted and accurate means of recognition is human recognition of a known person, which presents many shortcomings. Among the myriad problems with reliance on human recognition are the costs of staffing, the tendency of the staff to become tired or distracted (either by chance distractions or deliberate diversions), the inability of most people to remember more than a few target faces, and the ability to fool human observers with simple disguises. Second, current automated technology also has many shortcomings. Typically, two-dimensional recognition is attempted by trying to correlate a subject being tested against a database of two-dimensional images. Such techniques result in many missed identifications and false positives. Moreover, these two-dimensional techniques also can be fooled with simple disguises, just as human observers can be fooled.

Other technologies used for imaging also have drawbacks. Image recognition based on other than two-dimensional data would use a reference database of other than two-dimensional data to detect sought-after subjects. Gathering such data requires cooperation from the subjects that is not likely forthcoming. Further, at present, covert means to collect such data is unavailable.

Thus, there is an unmet need in the art for an automated human identification technology that is accurate and practical such that criminals or terrorists can be reliably detected with a minimum of false positives thereby enhancing the security of individuals.

SUMMARY OF THE INVENTION

The present invention provides a method and system for creating a quantitative representation of a surface of a human subject. Embodiments of the present invention allow for covert data gathering about human subjects of interest. Using a technique known as Inverse Synthetic Aperture Radar (ISAR), data representing a three-dimensional map of the human subject can be gathered, which is a more complete, quantitative representation than a two-dimensional map. A collection device can be made portable for covert data gathering. A collection device also can be mounted in a fixed location for scanning potential human subjects at a desired location. According to embodiments of the present invention, human subjects such as terrorists, criminals, or other persons of interest in remote locations can be covertly scanned using a portable collection device, and quantitative representations of the subjects can be stored in an archive. At national borders and other checkpoints, another collection device can similarly scan and create a quantitative representation of potential human subjects at that checkpoint and check the quantitative representation against the archive. If a potential human subject scanned at a border or checkpoint is catalogued in the archive, personnel can be alerted that a human subject of interest has presented himself or herself at that location.

More specifically, embodiments of the present invention gather data representing a physical appearance of a human subject using ISAR. A laser source signal is directed toward the human subject as he rotates through a range of motion and the return signal is collected. The returned signal is transformed into a quantitative, three-dimensional representation of the subject, using an adaptation of spectral processing (Fourier) analysis. The quantitative representation can be added to an archive or can be checked against an archive to determine if the human target is indexed in the archive.

In accordance with further aspects of the invention, the output level of the source signal is not high enough to harm the human subject, and suitably can be in the infrared (invisible) spectrum, improving covert operations. The system utilizes a dual signal source with one constant wavelength source signal and one variable wavelength source signal. Surface data of the subject is obtained from the reflections of the variable wavelength source, while atmospheric and other environmental effects are quantified with reflections from the constant wavelength source. The variable wavelength source may also be called a chirped source. Both source signals can be split into a transmission signal and a reference signal, with the transmission signal directed toward the human subject and the reference signal collected near the source.

The returned signal may be measured using a two-dimensional detector array having a plurality of detecting elements being responsive to signals in the spectra of the signal source. The detecting elements may include a plurality of individual detecting cells such that an output of one of the detecting elements represents an average of the signals collected by the individual detecting cells and also may include a plurality of reference sub-arrays for measuring human subject orientation. The transmission signal may be directed toward the human subject using a beam expander and collected using a beam collector, each of which suitably may include a system of lenses and mirrors. Once the returned signal is collected, it can be transformed from an analog to digital form and further transformed using Fourier techniques.

In accordance with further aspects of the invention, an apparatus of the present invention can be sufficiently portable as to be carried by human subjects. Data collected can be added to an archive for later comparison of catalogued subjects and/or compared to the archive to determine if the human subject is catalogued in such an archive.

BRIEF DESCRIPTION OF THE DRAWINGS

The preferred and alternative embodiments of the present invention are described in detail below with reference to the following drawings.

FIG. 2A is a block diagram of a focal plane array used in the radar data acquisition system of FIG. 1;

FIG. 2B is a sub-array of the focal plane array of FIG. 2A;

DETAILED DESCRIPTION OF THE INVENTION

Figure 1:
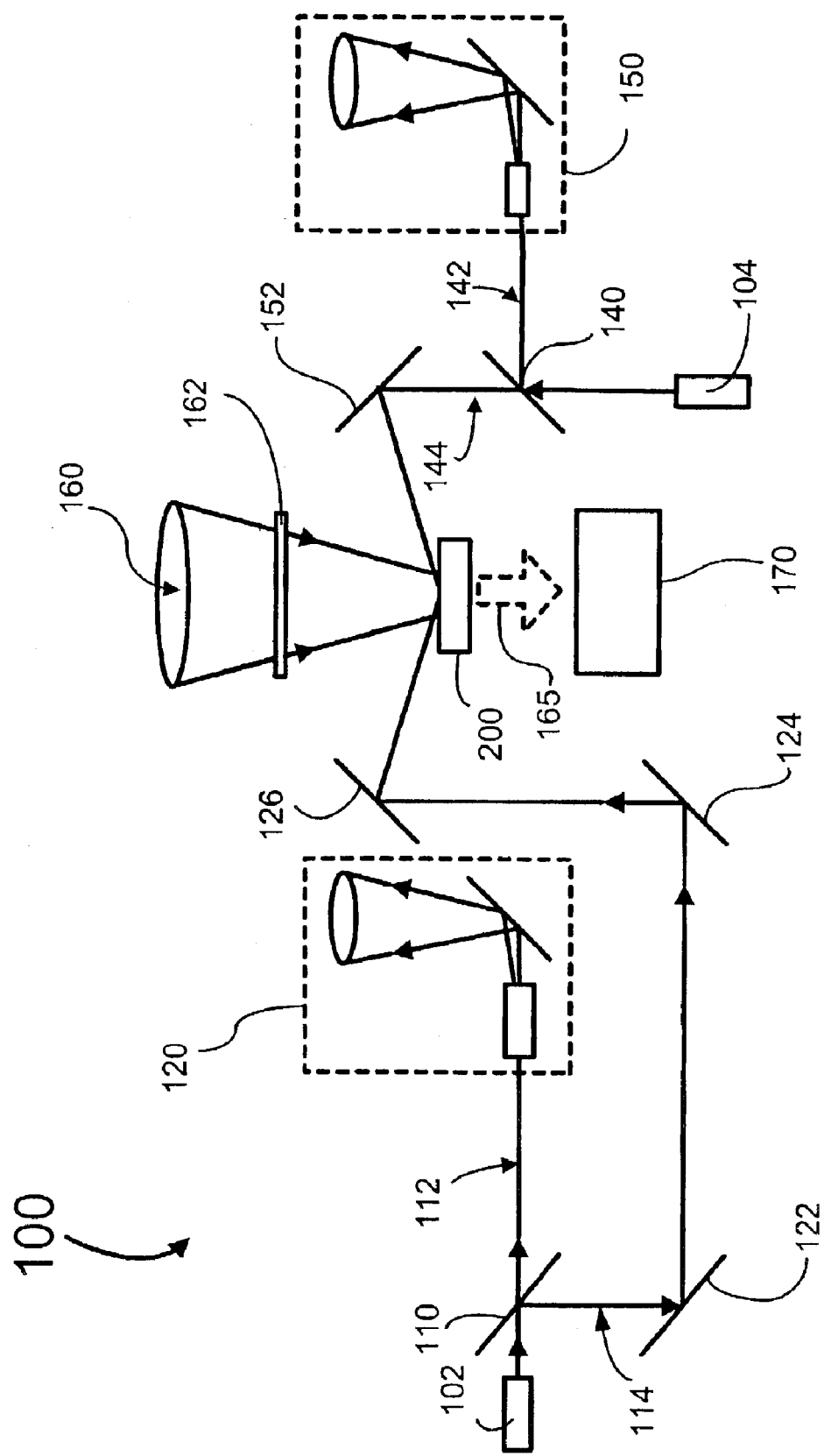
FIG. 1 is a diagram of an optical subsystem of a radar data acquisition system according to one embodiment of the present invention.

By way of overview, embodiments of the present invention gather data representing a physical appearance of a human subject using ISAR. A chirped signal is directed toward the human subject as he rotates through a range of motion and the return signal is collected. The returned signal is transformed into a quantitative representation of the surface. The quantitative representation can be added to an archive or can be checked against an archive to determine if the human target is indexed in the archive.

More specifically, embodiments of the present invention use the three-dimensional contours of the human face as an "imaging fingerprint" to identify individuals of interest. Quantitative data derived from three-dimensional representations of human faces of the individuals of interest can be archived. Then, as a defensive tool deployed at borders and other locations, persons passing that point can be scanned, quantitative representations of their likenesses generated, and those representations can be checked against the archive. Thus, for example, data can gathered about suspected or known terrorists and archived for later reference. Monitoring systems can be deployed at national borders, in airports, and at other locations to survey passersby, generate quantitative representations of faces of the passersby and compare them to the archive. If a match is found, suggesting that a person has been scanned who looks like an individual catalogued in the archive, the person can be further monitored, questioned, or detained as appropriate to the situation. Such a system also could be used to identify criminals or suspected criminals, missing children, suspected kidnap victims, or other sought-after individuals. An aspect of embodiments of the present invention is that a data gathering device can be made sufficiently portable to allow for covert data-gathering from clandestine locations or from a distance. Thus, the individuals of interest need neither cooperate nor even be aware of the data gathering.

It also will be appreciated that such a system could be used as a security device for entry into secured facilities, replacing keypads, badge readers, and similar devices. In such an embodiment, the system would be used to build an archive of authorized individuals and then used to check whether the individual seeking entry is in the archive.

By way of further overview, ISAR is adapted to collect data about human subjects. As is understood by one ordinarily skilled in the art, classic Synthetic Aperture Radar (SAR) benefits from a radar platform moving relative to the region of interest, thereby allowing for a synthesized effective aperture along the down-range motion of the radar system. Since there is a direct relationship between resolution and aperture size, a large synthetic aperture provides significant resolution improvements. Embodiments of the present invention use an inverse SAR system where the radar system is stationary, but the region of interest, or subject, is rotating. The differential movement provides the same beneficial effects of the SAR system. The result is improvements in resolution similar to those of a SAR system. Movement of the subject's head (side-to-side or up-and-down), volitionally or otherwise, provides for differential movement between the subject and the collecting device. Rotation of the subject is accurately measured, but is not controlled; for covert image capture, it is desirable that control of the rotation is not a requirement.

Embodiments of the present invention use signal sources in an infrared range and having an energy output below that which will harm the human subjects being scanned. A dual source is used having a constant wavelength source and a variable wavelength source. The variable wavelength source may be a chirped mode source to facilitate data gathering, as will be further described. Interference between samples of the original sources (used as reference signals) and signals scattered by the human subject are used to generate representations of interest. Suitable signal sources are split into reference and transmission components using optical beam splitters. The transmission components are directed at subjects using beam expanders. Reference signals and returned signals, collected using optical beam collectors, are focused on a focal plane array for measuring the signals. Analog-to-digital conversion techniques are used to convert the signals received at the focal plan array into a digital quantity for processing. The measured signals are then processed as will be further described to create the quantitative representations to be used in the identification processes previously described.

More specifically, one exemplary embodiment of a data gathering device 100 is diagrammed in FIG. 1. The data gathering device 100 employs first and second laser sources 102 and 104. The first laser source 102 is a pulsed, variable wavelength laser, which, in one presently preferred embodiment, is a pulsed-chirped mode laser source. The second laser source 104 is a constant wavelength laser source. Both laser sources 102 and 104 are directed at the human subject of interest. Interference between reflected and reference components of the signals generated by the laser sources 102 and 104 are measured at a focal plane array 200. Analog data gathered at the focal plane array 200 is converted to digital information and mathematically transformed into fingerprint data, as will be further described below.

In one presently preferred embodiment, directing the laser sources 102 and 104 and gathering reflected and reference signals is accomplished using a system of beam splitters, mirrors, and lenses. An output of the variable wavelength laser 102 is directed toward a first beam splitter 110, which splits the output of the variable wavelength laser 102 such that around 90% of the power of the output of the variable wavelength laser 102 is an imaging component 112 that will be transmitted, and used to image the human subject. The remaining approximately 10% of the output is a reference component 114 that will be directed toward the focal plane array 200 and used as a reference signal.

The imaging component 112 is submitted to a first beam expander 120. The first beam expander 120 suitably is a mirror and/or lens system configured to direct and spread the imaging component 112 to scan the human subject. It will be appreciated that a beam expander expands an input signal to scan a wider area, working in an opposite manner to that in which a telescope collects and focuses signals from a wider area to a smaller area. The reference component 114 of the variable wavelength laser 102 is redirected by mirrors 122, 124, and 126 to the focal plane array 200 where the reference component 114 suitably is used for comparison with returned signals, as will be described below.

An output of the constant wavelength laser 104 is split by a second beam splitter 140 into a constant wavelength imaging component 142 and a constant wavelength reference component 144. Again, in one presently preferred embodiment, the output of the constant wavelength laser 104 is split with around 90% of the output directed as the constant wavelength imaging component 142. The remaining approximately 10% of the output is a constant wavelength reference component 144 which is directed toward the focal plane array 200 by a mirror 152 and mixed with the pulsed-chirped reference component 114. The constant wavelength imaging component 142 is supplied to a second beam expander 150. The second beam expander 150, like the first beam expander 120, suitably is a mirror and/or lens system configured to direct and spread the constant wavelength imaging component 142 toward the subject.

Returned signals are gathered by a receive telescope 160. The receive telescope 160, like the beam expanders 120 and 150, suitably uses a system of mirrors and/or lenses to collect and concentrate signals scattered and returned by the human subject. It may be desirable to pass the returned signals through an optional filter 162 to assist in rejecting undesirable signals at wavelengths other than those used by the laser sources 102 and 104. Such a filter will aid in defeating possible counter-measures for covert operation. Concentrated signals gathered by the receive telescope 160 are applied to the focal plane array 200 for measurement. An output of the focal plane array 200 is supplied to a processing conduit 165, which allows the gathered signals to be processed.

A processing system 170 receives gathered signals from the focal plane array 200 via the conduit 165. Signals received are analog in nature, and are suitably converted to digital signals by known A-to-D converters for further processing by a computing system, as will be further described below.

FIG. 2A shows the focal plane array 200 shown in FIG. 1 in greater detail. In the exemplary embodiment shown in FIG. 2A, the focal plane array 200 is an array of subarrays 210 of photosensitive cells. The individual photocells 220 used in embodiments of the present invention are appropriately responsive to the spectra of energy generated by the system 100 (FIG. 1). Thus, for example, if an infrared spectrum of source signals is used, the photocells 220 chosen should be those which are well-suited to respond to longer-wavelength infrared signals.

FIG. 2B shows an enlarged view of one of the subarrays 210. Each subarray 210 in the exemplary embodiment is a four-by-four array of photocells 220. An output (not shown) of each subarray 210 is the average of the sixteen individual photocells 220. Taking an average output of the individual photocells 220 in the subarray 210 helps to reduce speckle and spurious signals caused by noise and other factors, which affect individual photocells 220 in a photosensitive system.

Figure 2C:
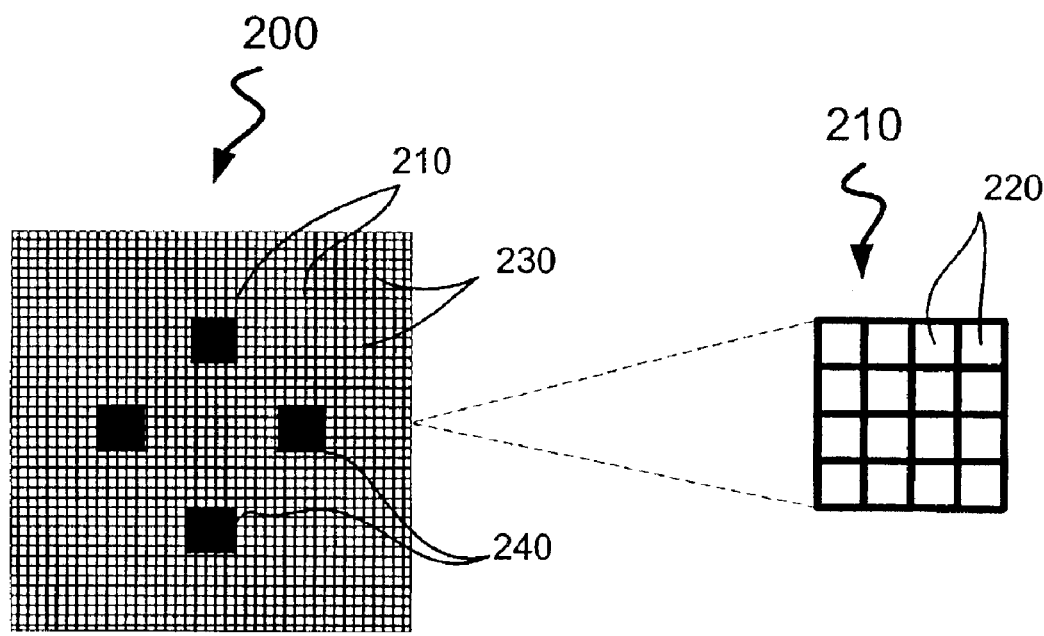
FIG. 2C is a schematic of an averaging circuit for averaging readings of a plurality of photocells such as sub-array of FIG. 2B.
Figure 2C:
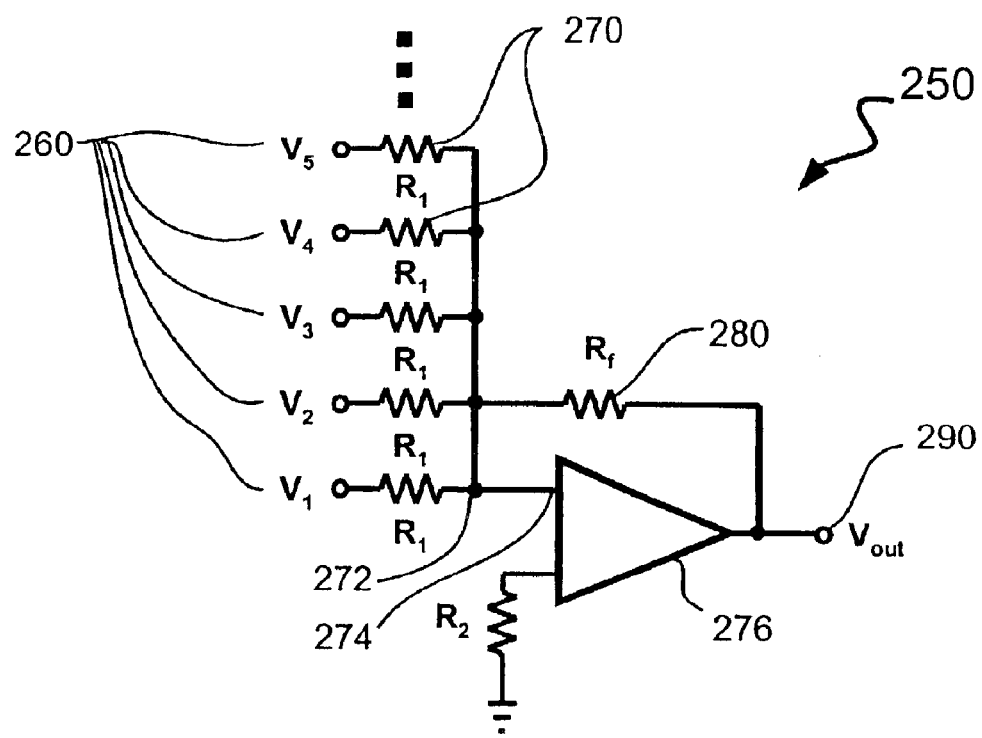

Methods for taking such an average of the photocells 220 are known in the art. A first suitable method for photocell averaging is depicted in FIG. 2C. FIG. 2C is a schematic of an averaging circuit 250 for averaging readings of a plurality of voltage sources such as would be produced by the photocells 220 of a sub-array 210 (FIGS. 2A and 2B). An output of a photocell 220 is a voltage representing an intensity of the light energy striking the photocell 220 plus some random noise. Averaging can be used to reduce or eliminate the random noise.

The averaging circuit 250 receives a plurality of voltage sources 260, in this case $V_1$ through $V_5$. The voltage sources 260 suitably could be outputs of photocells 220 such as those used in the focal plane array 200 (FIG. 2A). The circuit 260 can be expanded to use a number of photocells 220, such as the sixteen photocells used in the sub-arrays 210. More specifically, the averaging circuit 250 couples each of the plurality of voltage sources 260 through a plurality of first resistors 270, each of the first resistors having a resistance $R_1$, to a common node 272 which is coupled with a first input 274 of an amplifier 276. A feedback resistor 280 having a resistance $R_f$ couples an output $V_{out}$ 290 of the amplifier 276 with the common node 272. In this configuration, a value of the output $V_{out}$ 290 can be expressed by equation (1):

$$V_{out} = \frac{R_f}{R_1}(V_1 + V_2 + V_3 + V_4 + V_5 + \ldots) \tag{1}$$

Thus, the ratio of $R_f$ to $R_1$ determines the amplification of the averaging circuit 250. The output $V_{out}$ 290 can be used to amplify the sum of the voltage sources 260 or the values of $R_f$ and $R_1$ can be manipulated to yield an average of the voltage sources 260.

A second suitable method to average the output of the photocells 220 (FIGS. 2A and 2B) would be to first convert an analog output of each photocell 220 to a digital value using an A/D converter. The digitized numerical values could then be mathematically averaged using software Using either method, the average output for a group of N photocells can be expressed by equation (2):

$$Avg = \frac{1}{N}\sum_{n=1}^{N}(S(n) + G(n)) \tag{2}$$

In equation (2), Avg. is the represents the average output generated using either averaging method described above, N=number represents the number of photocells, S represents an intensity of the light energy striking on cell n, G=noise output of cell n. Expanding equation (2) yields equation (3):

$$Avg = \frac{1}{N}\left(\sum_{n=1}^{N}S(n) + \sum_{n=1}^{N}G(n)\right) \tag{3}$$

The intensity of the light energy S(n) is approximately equal for each photocell 220 because the photocells are situated close to each other as shown in FIGS. 2A and 2B. Summing of the values of S(n) for the photocells 200 yields a non-zero sum. However, if the noise is assumed to be uniformly distributed the sum of the noise outputs G(n) should yield a true mean of zero. Signal-to-noise ratio is expressed by equation (4):

$$\text{Signal-to-noise ratio} = \frac{S(n)}{G(n)} \tag{4}$$

The signal-to-noise for a single cell x is expressed by equation (5):

$$\text{Signal-to-noise ratio for cell } x = \frac{S(x)}{G(x)} \quad (5)$$

For N cells, the signal-to-noise ratio is expressed by equation (6):

$$\text{Signal-to-noise ratio for } N \text{ cells} = \frac{S(n)}{\sum_{n=1}^{N}(G(n))} \quad (6)$$

(S(n))/sum(G(n)) for the average. Since the sum(G(n)) approaches zero as n increases, the signal-to-noise ratio is increased and, thus, improved.

There is a tradeoff in averaging more cells together in seeking to further improve the signal-to-noise ratio. Using increasingly larger numbers of cells (values of N) undermines the assumption that the intensity of the light energy S(n) striking each photocell 200 is equal because, the more photocells 200 used, the further apart some of the photocells 200 will be. Choosing a four-by-four array of sixteen photocells 200, therefore, provides a workable compromise to improve the signal-to-noise ratio.

Referring back to FIG. 2A, the focal plane array 200 includes subarrays 210 used for different purposes. A majority of the subarrays 210 shown in the exemplary embodiment are imaging subarrays 230. The imaging subarrays 230 are used to measure signals scattered by a subject and received at the focal plane array to build the imaging "fingerprint" previously described.

The remaining subarrays 210 are used as reference subarrays 240 to measure rotation of the subject through an angular range. As previously described, one embodiment of the present invention employs inverse synthetic aperture radar (iSAR) exploiting movement of the subject being imaged through a range of motion (as opposed to synthetic aperture radar which exploits movement of the radar imaging source and sensor). The reference subarrays 240 are processed to measure the relative motion of the subject in performing the mathematical analysis of the data to create the imaging fingerprint. The reference subarrays 240 are used to detect changes in phase of collected signals from the imaging component 112 caused by rotational movement of the subject. Monitoring a change in phase received at a plurality of points on the focal point array 200 allows for determination of the rotational movement of the subject.

From the data collected at the focal plane array 200 (FIG. 2A) using the data gathering device 100 (FIG. 1), mathematical processing of the data generates the imaging fingerprint used in building the archive of human subjects as well as in performing comparisons against the archive. The signals collected at the focal plane array represent a pattern generated by a pattern of interference resulting from returned signals from both the variable wavelength imaging component and the constant wavelength imaging component, as well as their respective reference signals.

In an iSAR system, downrange resolution is enhanced by high-frequency chirping of the variable wavelength source 102 (FIG. 1). Down-range resolution generally is limited only by the available chirp bandwidth of the variable wavelength source 102, which is on the order of 10 GHz. Down-range resolution $\delta r_{res}$ is determined by the equation:

$$\delta r_{res} = c/(2BW) \quad (7)$$

In this expression, c is the speed of light and BW is the bandwidth of the chirped signal. The speed of the analog-to-digital converters can limit the resolution if the converters cannot proportionally track the received signal changes caused by chirping of the variable wavelength frequency source. Down-range ambiguity $\delta r_{amb}$, which determines the desired differentiation of the subject from other objects in the down-range dimension, is defined by the following equation in which N represents the number of samples taken per chirp:

$$\delta r_{amb} = c*N/(2BW) \quad (8)$$

In this expression, substituting $\delta r_{res} = c/(2BW)$, equation (7) also can be written as:

$$\delta r_{amb} = N*\delta r_{res}. \quad (9)$$

The value of N is determined by the chirp rate of the variable wavelength source (which is on the order of $4 \times 10^6$ GHz per second), and the conversion rate of the A/D converters.

Cross-range resolution $\delta r_{res}$ is determined by the phase variation of the returned scattered signal as an angle of illumination is varied by a known amount. Cross-range resolution $\delta r_{res}$ is given by the equation:

$$\delta r_{res} = \lambda/2 \sin(\theta_{max}) \quad (10)$$

For the very small angles used in this application, it is appropriate to approximate the value of the geometric measurement, sine of the angle, as equal to the angle itself. In this expression, $\lambda$ is the wavelength of the signal source and $\theta_{max}$ is the maximum range of angular rotation of the illuminated subject. Cross-range ambiguity $\delta r_{amb}$, which defines how far separated objects can be before they are no longer differentiable, is defined by the equation $\delta r_{amb} = \lambda/2\Delta\theta$ where $\Delta\theta$ is the relative change of beam angle between the subject and the source between consecutive chirps of the variable wavelength source. $\delta r_{amb}$ also can be written as:

$$\delta r_{amb} = M*\delta x_{res} \quad (11)$$

In this expression, M is the total number of chirped waveforms transmitted and recorded.

As previously described, embodiments of the present invention generate three-dimensional representations of the subjects being scanned, which can be represented by equations (12) and (13):

$$F(k_x,k_y,k_z) = \int\int dx\,dy\,dz f(x,y,z) e^{j(k_x x + k_y y + k_z z)} \quad (12)$$

$$f(x,y,z) = \int\int dk_x\,dk_y\,dk_z F(k_x,k_y,k_z) e^{-j(k_x x + k_y y + k_z z)}/(2\pi)^3 \quad (13)$$

In equation (12), $F(k_x,k_y,k_z)$ represents the Fourier spectral representation of the returned signal. In equation (13), $f(x,y,z)$ represents a spatial intensity of the signal relative to a position in space defined by the coordinates x, y and z. For a very small target rotation angle relative to the z-axis, these equations yield:

$$k_x = k_0 \hat{k} * \hat{x} = k_0 \alpha_x \quad (14)$$

$$k_y = k_0 \hat{k} * \hat{y} = k_0 \alpha_y \quad (15)$$

$$k_z = k_0 \sqrt{1-\alpha_x^2-\alpha_y^2} \approx k_0 \quad (16)$$

$$f(x,y,z) = \int\int k_0^2 dk_0\,d\alpha_x\,d\alpha_y F(k_0,\alpha_x,\alpha_y) e^{-j(k_0(\alpha_x x + \alpha_y y) + k_0 z)}/(2\pi)^3 \quad (17)$$

It should be noted that the z-axis defines the down-range dimension of the system.

Thus, once appropriate data have been gathered for a human subject under scanning, a Fourier spectral representation or the spatial intensity relative to a position in space can be derived, either or both of which can be used as imaging fingerprints to identify the human subjects. The measured complex Fourier quantities, such as $F(k_x, k_y, k_z)$ might be used instead of the spatial intensity calculations for $f(x,y,z)$. The Fourier decomposition of the profile is a ready-made means of pattern recognition and may be preferable to the spatial intensity information as a target identifier.

Considering the system 100 (FIG. 1) and focal plane array 200 (FIGS. 1 and 2A) in light of the foregoing discussion, a further appreciation of the operation of embodiments of the present invention can be reached. Information is available at the focal plane array 200 on a pixel-by-pixel basis. With a fixed scan angle and a chirped mode variable wavelength signal imaging component 112 (FIG. 1), any subarray 210 yields one dimension of the total surface map: the down-range profile of a corresponding point on the human subject. The range resolution of this data depends on the chirp bandwidth as previously described. Repetitively pulsing the chirped mode variable wavelength signal imaging component 112 while the human subject rotates through a small, two-dimensional angular range relative to the z-axis results in phase and frequency content of the collected signals presenting both down-range and cross-range information. Collecting the data received and transformed to derive $f(x,y,z)$, down-range and cross-range profiles for each pixel are available which, in turn, can be aggregated across the pixels of the focal plane array 200 to form complete imaging fingerprints.

Figure 3:
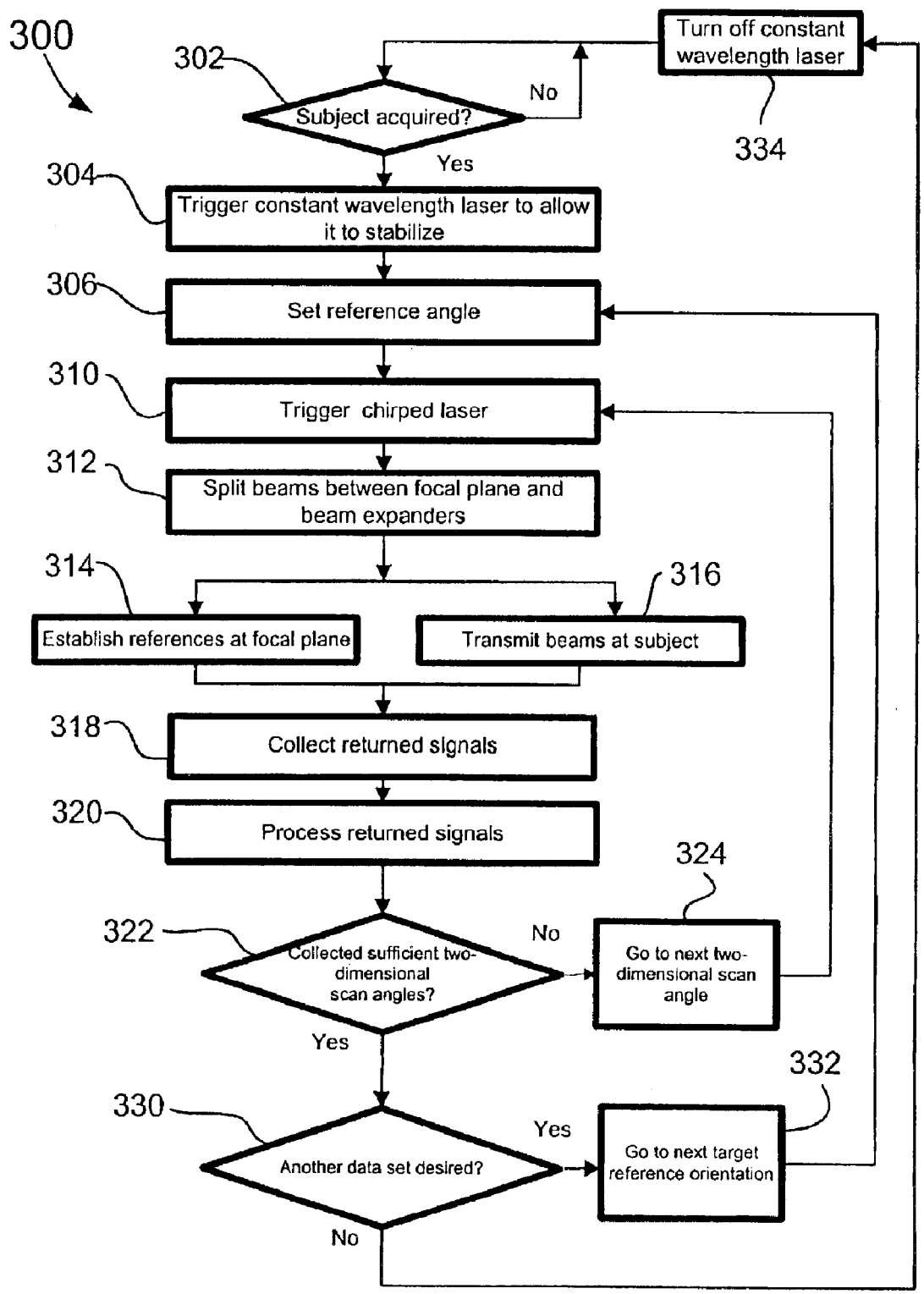
FIG. 3 is a flowchart of a method used by an embodiment of the radar data acquisition system of FIG. 1.

FIG. 3 is a flowchart of a routine 300 for using embodiments of the present invention for collecting imaging fingerprints of subjects to be stored in an imaging database or for capturing an imaging fingerprint of a subject to determine if the subject's imaging fingerprint is stored in the imaging database. For collecting imaging fingerprints in the field, embodiments of the present invention are suitably operated in two modes: target acquisition mode and image capture mode. Accordingly, the routine 300 begins at a decision block 302 where it is determined if a subject has been acquired. In one presently preferred embodiment, the target suitably is acquired by illuminating the subject with the laser source in a low-power, constant wavelength mode. By using a high power spotting telescope, an operator of the system 100 (FIG. 1) can determine when the subject is properly targeted for collecting the imaging footprint. When it is determined at the decision block 302 that the subject has not been properly acquired, the routine 300 loops to the decision block 302 until a subject has been properly acquired. Once the subject has been acquired, the routine 300 continues at a block 304 by triggering the constant wavelength laser source 104 (FIG. 1) to allow it to stabilize. At a block 306, the routine 300 sets the reference direction in a two-dimensional scan space, e.g., along the z-axis. For example, when the z-axis is chosen as the downrange direction as in the example described in connection with FIG. 1, the two scan dimensions suitably are the x- and the y-axes.

At a block 310, the variable wavelength chirped laser source 102 (FIG. 1) is triggered. The chirped laser is switched on and off to provide a short-duration, frequency-swept beam (pulse) for illuminating the subject. As previously described, at a block 312 the beams of both laser sources are split. Splitting the beam at the block 312 allows references to be established at the focal plane array at a block 314 while the remaining components of the laser sources are transmitted at the subject at a block 316. Once the signals transmitted have been scattered and reflected, at a block 318 returned signals are collected at the focal plane array 200 (FIG. 2A) where a pattern results from interference between the reference beams and the returned signals. At a block 320, the returned signals are processed as previously described. Analog output of the focal plane array 200 is recorded at chosen frequencies by down-conversion and converted by analog-to-digital converters. Orientation of the subject is referenced by relative phasing measured at the reference subarrays 240 (FIG. 2A).

At a decision block 322 it is determined if the two-dimensional scan space has been adequately sampled. If not, the routine 300 loops back to the block 310 and triggers the chirped laser again. On the other hand, if the sampling is adequate, the routine 300 proceeds to a decision block 330. Throughout these processes, incremental angular movement of the subject is calculated by measuring the relative phasing detected at the reference subarrays 240 (FIG. 2A) and stored with the corresponding returned signals.

At the decision block 330, it is determined if another complete data set is desired. If so, at a block 332 the system moves to a new target reference direction data set and the routine 300 loops to the block 306 where the z-axis is reset and another two-dimensional scan commences. If not, the routine 300 proceeds to a block 334 where the constant wavelength laser source is powered off. The routine 300 then proceeds back to the decision block 302 waiting for acquisition of another subject.

For a non-limiting example to further describe operation of embodiments of the present invention, it will be assumed that the data is being collected at a range of one kilometer to allow for covert capture of an imaging fingerprint of one or more human subjects of interest using a 10-centimeter aperture receive telescope 160 (FIG. 1). Operational parameters can be derived from the equations previously stated. For desirable sampling of pixels in the focal plane array, a sweep angle producing a one-wavelength (or 360-degree phase variation) at edges of the focal plane array 200 at pixel extremities is desirable. A 1.5 μm laser is selected because there is an atmospheric window at that wavelength which provides for good transmission, although the wavelength could be chosen to best take advantage of anticipated atmospheric and meteorological situations. Thus, for a range of one kilometer, using a 1.5 μm wavelength laser and a 10-centimeter aperture receiving telescope 160, these operating values can be derived:

$\Delta\alpha$=angular resolution=$\lambda/D$=1.5×10$^{-6}$/0.1=1.5×10$^{-5}$ radians;

$W_p$=pixel width=$R^*\Delta\alpha$=10$^5$ cm×1.5×10$^{-5}$ radians=1.5 cm=10$^4\lambda$; and $\Delta\beta$=sweep angle for 360 degree phase variation=0.5$^*\lambda/W_p$=5×10$^{-5}$ radians.

Normal rotational movement of a human head from, for example, nodding or head-shaking, occurs at a rate of approximately one radian per second. Inverse synthetic aperture radar benefits from this rotation which, in effect, improves radar resolution. A desired rotation of the head of the subject yielding a ten-fold improvement in cross-range resolution from rotation of the subject's head results from rotation on the order of one-half a milliradian at a distance of one kilometer, resulting in a cross-range resolution expressed as:

$\delta x_{res}=\lambda/2\theta_{max}$=1.5 mm, or $\theta_{max}$=$\lambda$/3 mm=5×10$^{-4}$ radians.

As a result, pixel extremities in the focal plane array 200 (FIGS. 1 and 2A) are exposed to ten wavelengths of phase variation when a subject rotates through $5 \times 10^{-4}$ radians. Using a value of M=50 to achieve 50 total number of waveforms recorded during the chirp allows for one sample to be taken per one-fifth wavelength phase excursion at the pixel extremities. For rotation of the subject's head slower than one radian per second, more samples are desirable. It will be appreciated that the data capture parameters can remain at the same rate, but more samples are desirable. Thus, more data storage is consumed by the additional samples, but the operational parameters of the data capture system suitably remain unchanged.

Assuming a 10-gigahertz chirp bandwidth range and 200 samples are taken during the course of the chirp such that N=200, resulting resolutions and ambiguities can be derived from the previously-described equations:

$\delta r_{res} = c/2*BW = 1.5$ cm for down-range resolution;

$\delta x_{res} = \lambda/2\theta_{max} = 1.5$ mm for cross range resolution;

$\delta r_{amb} = N*\delta r_{res} = 3$ m for down-range ambiguity; and $\delta x_{amb} = M*\delta x_{res} = 7.5$ cm for cross-range ambiguity.

A down-range ambiguity of three meters allows for an imaging fingerprint of a subject to be captured not only when a clear line of sight to the subject is available where no obstacles are near the subject at all, but also in cases where the subject is no more than three meters from background objects that might also scatter imaging components of the radar signals. Background objects further than the down-range ambiguity distance must be removed from the image by other methods, such as time-gating or Doppler processing. These techniques are commonly used with pulsed-Doppler radars for the same purpose. The pixel width at the target is limited to 1.5 centimeters, so that the cross-range ambiguity of 7.5 centimeters does not affect subject imaging.

A down-range distance of one kilometer also establishes a desired duty cycle for the variable wavelength laser source 102. A round-trip signal time for a subject at a distance of one kilometer is six microseconds. Accordingly, the chirped mode variable wavelength laser may be turned on for six microseconds but then suitably is shut off for six microseconds while reflected and scattered signals can be returned. Thus, a variable wavelength laser having an available chirp rate of $3.8 \times 10^6$ gigahertz per second suitably is used to provide for cycling through a sequence in 5.2 to 6 microseconds before the laser is shut off for signal gathering.

Using a variable laser source with such a duty cycle, each chirped pulse suitably is sampled at 200 frequency points over the six microsecond receive duration. As a result, the sampling period is thirty nanoseconds or about 33 megahertz. Resulting signals from the ten gigahertz bandwidth RF signal generated by the variable wavelength laser source 102 (FIG. 1) suitably are sampled in at least two ways. A bank of fast track-and-hold type devices can be used in connection with a 33 megahertz analog-to-digital converter. Alternatively, to reduce the speed of the hardware devices, the returned signals can be mixed with a stable reference chirp. The RF power output of each subarray 210 (FIGS. 2A and 2B) of the focal plane array 200 (FIGS. 1 and 2A) can be derived from the equation:

$$P(t) = P_{ref}(t) + P_{sig}(t) + 2*\sqrt{(P_{ref(t)}*P_{sig(t)})}*\cos(2\pi\Delta f(t) + \Delta\phi(t)) \quad (18)$$

In the foregoing equation (12), $\Delta f(t)$ represents a difference between the chirp frequency and the reference frequency, while $\Delta\phi(t)$ represents a difference between the chirped signal phase and the reference phase.

Also with regard to selecting the laser sources 102 and 104 (FIG. 1), one consideration is eye safety. Outputs of the system 100 should be considered both in the target acquisition/constant wavelength mode and the imaging/chirped laser mode. In target acquisition mode, if the laser has a wavelength in excess of 1.4 microns, even for exposure times of several minutes, the maximum allowable flux density is one kilowatt per square meter. This exceeds a minimum power level suited for target acquisition. In imaging mode, for a wavelength range of 1.55 microns to one millimeter and a pulse duration of a millisecond or less, maximum safe exposure exceeds 3000 Joules per square meter. Using a fifty-percent duty cycle laser over the one millisecond duration, the maximum power density on a one square meter target is $6 \times 10^6$ watts or less. As a result, eye safety considerations do not present an implementation obstacle, and the laser may be considered a class one 1 device. It also should be noted that atmospheric transmission of laser signals is considered good for lasers operating in the 1.5 to 1.7 and 2.1 to 2.4 micron ranges. Because laser safety is not an issue over these ranges, wavelength choice suitably is determined as a result of a spectrum of expected background sources and availability and price-performance of lasers and detectors.

Using a focal plane array 200 (FIGS. 1 and 2A) of 160 by 160 pixels structured into 40 by 40 subarrays 210 (FIGS. 2A and 2B) results in 1600 data channels. Sampling these channels at 200 frequency points for 100 by 100 angle points results in 3.2 billion complex numbers for a full three-dimensional profile. One or more subsets of this data can be extracted to key on certain features of the subject to reduce the data storage and/or data processing requirements of a system.

Figure 4:
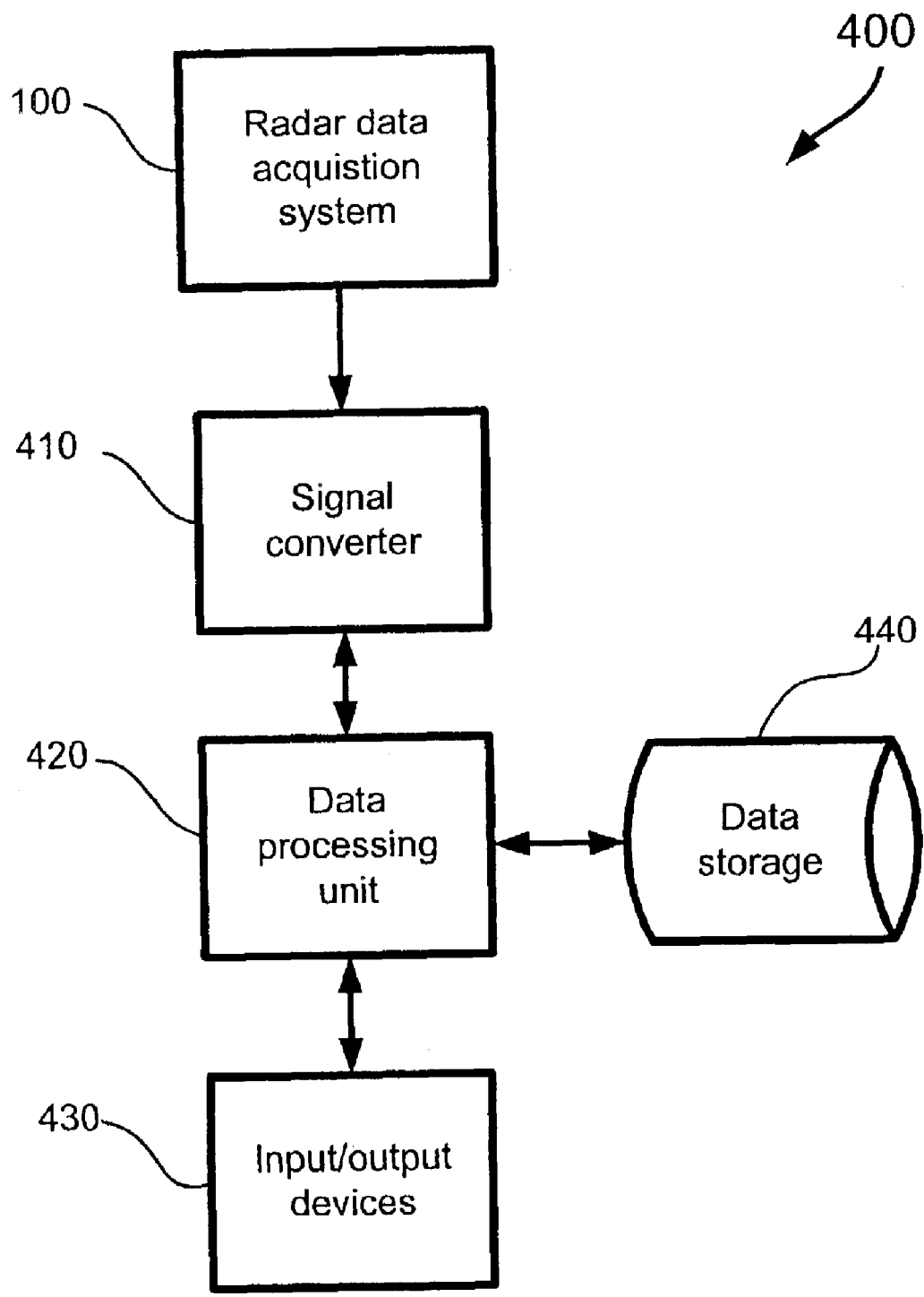
FIG. 4 is a block diagram of a target data analysis system using an embodiment of the present invention.

FIG. 4 is a block diagram of another embodiment of the present invention. The system 400 includes a radar data acquisition system 100 (FIG. 1) including the energy sources and optics previously described. Coupled to the radar data acquisition system 100 is a signal converter 410. The signal converter 410 in this embodiment is an analog-to-digital converter for transforming the analog signals measured at the focal plane array 200 (FIG. 2A) into digital signals for processing. Coupled to the signal converter 410 is a data processing unit 420, such as a computer system, which is programmed to perform the mathematical calculations and transformations on the data. Coupled to the data processing unit 420 are input and output devices 430 providing for user or external system control of the data processing unit 420. The data processing unit 420 also is coupled to data storage 440. The data storage 440 could be a storage device allowing for recording of imaging fingerprints captured by a system used for gathering imaging fingerprints to be added to an archive.

Alternatively, the data storage device 440 could be an archive used to screen imaging fingerprints captured at a secured location. For example, at an airport, imaging fingerprints of prospective airline passengers could be captured and compared to an archive containing imaging fingerprints of suspected terrorists, criminals, or other persons who are not desired as passengers. If an imaging fingerprint of a prospective passenger substantially matches an imaging fingerprint of a suspected terrorist, criminal, or other undesirable person stored in the archive, an alert is communicated to security personnel. The security personnel can then investigate further to determine if the prospective passenger is the undesirable person whose imaging fingerprint the prospective passenger's imaging fingerprint substantially matched. The system also could be programmed to retrieve a series of best matches for the prospective passenger's imaging fingerprint and allow security personnel to make a determination if the prospective passenger is a substantial match for the catalogued individual. Such a determination could be made using conventional photographs or other information associated with the imaging fingerprint of the substantially matching imaging fingerprint in the archive or made available through another database to further investigate possible matches.

For another example, the system 400 could be deployed at a secured facility where imaging fingerprints of persons desiring entry to the facility could be captured and compared to an archive containing imaging fingerprints of persons with security clearance permitted to the enter the facility. The system 400 would operate analogously to the system 400 in the previously described example with two exceptions. First, covert imaging would not be used to build the archive because individuals granted clearance to enter the facility would pose for scanning much as persons conventionally pose for id badge photographs. Second, instead of it presenting a concern if an imaging fingerprint of an individual desiring entry matched an archived imaging fingerprint, in this example it would present a concern and/or trigger an alarm if the individual's imaging fingerprint did not match an archived imaging fingerprint. In this example, it is when the individual's imaging fingerprint does not find a substantial match that there is a concern because the individual seeking entry may not have clearance. As in the last example, the system 400 could be configured and/or programmed to yield a list of best substantial matches with the ultimate matching being performed by human operators.

Advantageously, the embodiments of the present invention significantly improve over other image capturing devices such as conventional cameras. Table 1 compares and contrasts operative values of a conventional camera as compared with an embodiment of the present invention, for an assumed acquisition range of 1 km, as described in the preceding text:

TABLE 1

|  | Conventional Camera ($\lambda$ = .5 $\mu$m) | IR Laser Camera with ISAR ($\lambda$ = 1.55 $\mu$m) |
|---|---|---|
| Cross-range resolution | 5 mm | 1.5 mm |
| Down-range resolution | none | 1.5 cm for 10 GHz bandwidth |
| Image features | 2D with image contrast provided over wavelength range of film response | 3D with image contrast at essentially single wavelength (~1.55 $\mu$m) |
| Covert operation limitation | Daylight only | Day and night |
| Complexity | Slight to moderate - high quality optics | Pulsed chirped infrared laser, focal plane array of suitably fast detectors, suitably fast A/D converters |

While a preferred embodiment of the invention has been illustrated and described, many changes can be made to the embodiments without departing from the spirit and scope of the invention. Accordingly, the scope of the invention is not limited by the embodiments described and the examples provided. Instead, the scope of the invention should be determined entirely by reference to the claims that follow.

What is claimed is:

1. A method for creating a quantitative, three-dimensional representation of a surface of a subject, the method comprising:
   gathering surface data of the subject using an inverse synthetic aperture radar for directing a source signal toward the subject and maintaining the source signal on the subject while the subject is rotated through a range of motion;
   collecting a returned signal emitted from the subject; and
   transforming the returned signal into a quantitative, three-dimensional representation of the surface data of the subject, wherein the source signal includes a dual source signal having a first constant wavelength source signal and a second variable wavelength source signal, and the gathering of surface data includes measuring interference in the returned signal caused by interference between reference samples and reflections scattered by the subject of the first constant wavelength source signal and the second variable wavelength source signal.

2. The method of claim 1, wherein the source signal includes a first energy output level that is less than a second energy output level high enough to harm the subject.

3. The method of claim 1, wherein the source signal includes an infrared signal source.

4. The method of claim 1, wherein the second variable wavelength source includes a pulsed-chirped mode wavelength source.

5. The method of claim 1, further comprising forming a transmission signal and a reference signal by splitting the first constant wavelength source signal and splitting the second variable wavelength source signal.

6. The method of claim 5, further comprising directing toward the subject a first transmission component split from the first constant wavelength signal source and a second transmission component split from the second variable wavelength signal source.

7. The method of claim 5, further comprising collecting a first reference component split from the first constant wavelength signal source and a second reference component split from the second constant wavelength.

8. The method of claim 5, wherein the returned signal is measured using a two-dimensional detector array, the detector array including a plurality of detecting elements being responsive to signals in a spectra of the signal source.

9. The method of claim 8, wherein the detecting elements include a plurality of individual detecting cells such that an output of one of the detecting elements represents an average of the signals collected by the individual detecting cells.

10. The method of claim 8, wherein the two-dimensional array includes a plurality of reference sub-arrays for measuring subject orientation.

11. The method of claim 1, further comprising directing the source signal toward the subject using a beam expander.

12. The method of claim 11, wherein the beam expander includes an optical system using elements selected from the group consisting of lenses, mirrors, and a combination thereof.

13. The method of claim 1, further comprising collecting the returned signal from the subject using a beam collector.

14. The method of claim 13, wherein the beam collector includes an optical system using elements selected from the group consisting of lenses, minors, and a combination thereof.

15. The method of claim 1, wherein transforming the returned signal includes converting the returned signal from an analog signal to a digital signal.

16. The method of claim 1, wherein transforming the returned signal includes applying Fourier transformations such that the quantitative representation is a Fourier transform of the surface data.

17. The method of claim 1, further comprising storing the quantitative representation of the surface of the subject in a quantitative representation archive.

18. A method for identifying a subject indexed in an archive of previously catalogued subjects, the method comprising:
gathering surface data of the subject using inverse synthetic aperture radar by directing a source signal toward the subject as the subject is rotated through a range of motion;
collecting a returned signal;
transforming the returned signal into a quantitative representation of the surface data;
comparing at least a subset of the quantitative representation of the surface data with an archive of previously-catalogued subjects; and
reporting if the subject substantially matches at least one catalogued subject in the archive of previously-catalogued subjects, wherein the source signal includes a dual source signal having a first constant wavelength source signal and a second variable wavelength source signal, and the gathering of surface data includes measuring interference in the returned signal caused by interference between reference samples and reflections from the human subject of the first constant wavelength source signal and the second variable wavelength source signal.

19. The method of claim 18, wherein the source signal includes a first energy output level that is less than a second energy output level high enough to harm the subject.

20. The method of claim 18, wherein the source signal includes an infrared signal source.

21. The method of claim 18, wherein the second variable wavelength source includes a pulsed-chirped mode wavelength source.

22. The method of claim 18, further comprising forming a transmission signal and a reference signal by splitting the first constant wavelength source signal and splitting the second variable wavelength source signal.

23. The method of claim 22, further comprising directing toward the subject a first transmission component split from the first constant wavelength signal source and a second transmission component split from the second variable wavelength signal source.

24. The method of claim 22, further comprising collecting a first reference component split from the first constant wavelength signal source and a second reference component split from the second constant wavelength.

25. The method of claim 22, wherein the returned signal is measured using a two-dimensional detector array, the detector array including a plurality of detecting elements being responsive to signals in a spectra of the signal source.

26. The method of claim 25, wherein the detecting elements include a plurality of individual detecting cells such that an output of one of the detecting elements represents an average of the signals collected by the individual detecting cells.

27. The method of claim 25, wherein the two-dimensional array includes a plurality of reference sub-arrays for measuring human subject orientation.

28. The method of claim 18, further comprising directing the source signal toward the subject using a beam expander.

29. The method of claim 28, wherein the beam expander includes an optical system using elements selected from the group consisting of lenses, mirrors, and a combination thereof.

30. The method of claim 18, further comprising collecting the returned signal from the human subject using a beam collector.

31. The method of claim 30, wherein the beam collector includes includes an optical system using elements selected from the group consisting of lenses, mirrors, and a combination thereof.

32. The method of claim 18, wherein transforming the returned signal includes converting the returned signal from an analog signal to a digital signal.

33. The method of claim 18, wherein transforming the returned signal includes applying Fourier transformations such that the quantitative representation is a Fourier transform of the surface data.

34. The method of claim 18, further comprising adding the quantitative representation of the surface of the subject to the archive of previously catalogued subjects.

35. An apparatus for creating a quantitative representation of a surface of a subject, the apparatus comprising:
an inverse synthetic radar scanning device configured to gather surface data of the subject, the inverse synthetic radar scanning device being further configured to direct a source signal onto the subject while the subject is rotated through a range of motion and to collect a returned signal; and
a signal processing device configured to transform the returned signal into a quantitative representation of the surface data, wherein the source signal includes a dual source signal having a first constant wavelength source signal and a second variable wavelength source signal such that the surface data includes data representing interference in the returned signal caused by interference between the first constant wavelength source signal and the second variable wavelength source signal scattered by the subject.

36. The apparatus of claim 35, wherein the source signal includes a first energy output level that is less than a second energy output level high enough to harm the human subject.

37. The apparatus of claim 35, wherein the source signal includes an infrared signal source.

38. The apparatus of claim 35, wherein the second variable wavelength source includes a chirped mode wavelength source.

39. The apparatus of claim 35, wherein the inverse synthetic radar scanning device includes a transmission signal and a reference signal formed by splitting the first constant wavelength source signal and splitting the second variable wavelength source signal.

40. The apparatus of claim 39, wherein a first transmission component of the first constant wavelength signal source and a second transmission component of the second variable wavelength signal source are directed toward the subject.

41. The apparatus of claim 39, wherein a first reference component split from the first constant wavelength signal source and a second reference component split from the second constant wavelength are collected.

42. The apparatus of claim 39, wherein the inverse synthetic aperture radar scanning device further comprises a two-dimensional detector array for measuring the returned signal, the detector array including a plurality of detecting elements being responsive to signals in a spectra of the signal source.

43. The apparatus of claim 42, wherein the detecting elements include a plurality of individual detecting cells such that an output of one of the detecting elements represents an average of the signals collected by the individual detecting cells.

44. The apparatus of claim 42, wherein the two-dimensional array includes a plurality of reference sub-arrays for measuring human subject orientation.

45. The apparatus of claim 35, further comprising a beam expander configured to direct the source signal toward the subject.

46. The apparatus of claim 45, wherein the beam expander includes an optical system using elements selected from the group consisting of lenses, mirrors, and a combination thereof.

47. The apparatus of claim 35, further comprising a beam collector configured to collect the returned signal from the human subject.

48. The apparatus of claim 47, wherein the beam collector includes an optical system using elements selected from the group consisting of lenses, mirrors, and a combination thereof.

49. The apparatus of claim 35, wherein the signal processor is further configured to transform the returned signal from an analog signal to a digital signal.

50. The apparatus of claim 35, wherein the signal processor is further configured to transform the returned signal using Fourier transformations such that the quantitative representation is a Fourier transform of the surface data.

51. The apparatus of claim 35, wherein the quantitative representation of the surface of the human target is added to a quantitative representation archive.

52. The apparatus of claim 35, wherein the apparatus is sufficiently portable to be carried by human operators.

53. A computer readable medium for generating a quantitative, three-dimensional representation of a subject, the computer readable medium comprising:
   first computer program code means for receiving inverse synthetic aperture radar surface data of the subject gathered while the subject rotates through a range of motion, the inverse synthetic aperture radar surface data being generated by directing a source signal onto the subject, wherein the source signal includes a dual source signal having a first constant wavelength source signal and a second variable wavelength source signal such that the surface data includes data representing interference in the returned signal caused by interference between the first constant wavelength source signal and the second variable wavelength source signal scattered by the subject;
   second computer program code means for transforming the inverse synthetic aperture radar surface data of the subject into a quantitative, three-dimensional representation of the subject; and
   third computer program code means for storing the quantitative representation of the subject in a quantitative representation archive.

54. The computer readable medium of claim 53, wherein the second computer program code means transforms the inverse synthetic aperture radar surface data of the subject into a quantitative, three-dimensional representation of the subject by applying Fourier transformations to generate a Fourier transform of the surface data.

55. The computer readable medium of claim 53, further comprising:
   fourth computer program code means for comparing at least a subset of the quantitative representation of the surface data with an archive of previously-catalogued subjects; and
   fifth computer program code means for reporting if the subject substantially matches at least one catalogued subject in the archive of previously-catalogued subjects.

56. A computer readable medium for generating a quantitative, three-dimensional representation of a subject, the computer readable medium comprising:
   first computer program code means for gathering surface data of the subject while the subject rotates through a range of motion, the first computer program code means, including:
      second computer program code means for directing an inverse synthetic aperture radar system signal source toward the subject as the subject is rotated through a range of motion, wherein the inverse synthetic aperture radar system signal source includes a dual source signal having a first constant wavelength source signal and a second variable wavelength source signal such that the surface data includes data representing interference in the returned signal caused by interference between the first constant wavelength source signal and the second variable wavelength source signal scattered by the subject; and
      third computer program code means for collecting a collecting returned signals;
   fourth computer program code means for transforming the inverse synthetic aperture radar surface data of the subject into a quantitative, three-dimensional representation of the subject; and
   fifth computer program code means for storing the quantitative representation of the subject in a quantitative representation archive.

57. The computer readable medium of claim 56, wherein the fourth computer program code means transforms the inverse synthetic aperture radar surface data of the subject into a quantitative, three-dimensional representation of the subject by applying Fourier transformations to generate a Fourier transform of the surface data.

58. The computer readable medium of claim 56, further comprising:
   sixth computer program code means for comparing at least a subset of the quantitative representation of the surface data with an archive of previously-catalogued subjects; and
   seventh computer program code means for reporting if the subject substantially matches at least one catalogued subject in the archive of previously-catalogued subjects.

59. A computer readable medium for identifying a subject indexed in an archive of previously catalogued subjects, the computer readable medium comprising:
   first computer program code means for gathering surface data of the subject while the subject rotates through a range of motion, the first computer program code means, including:
      second computer program code means for directing an inverse synthetic aperture radar system signal source toward the subject as the subject is rotated through a range of motion, wherein the inverse synthetic aperture radar system signal source includes a dual source signal having a first constant wavelength source signal and a second variable wavelength source signal such that the surface data includes data representing interference in the returned signal caused by interference between the first constant wavelength source signal and the second variable wavelength source signal scattered by the subject; and third computer program code means for collecting a collecting returned signals;

fourth computer program code means for transforming the inverse synthetic aperture radar surface data of the subject into a quantitative, three-dimensional representation of the subject;

fifth computer program code means for storing the quantitative representation of the subject in a quantitative representation archive;

sixth computer program code means for comparing at least a subset of the quantitative representation of the surface data with an archive of previously-catalogued subjects; and seventh computer program code means for reporting if the subject substantially matches at least one catalogued subject in the archive of previously-catalogued subjects.

60. The computer readable medium of claim 59, wherein the fourth computer program code means transforms the inverse synthetic aperture radar surface data of the subject into a quantitative, three-dimensional representation of the subject by applying Fourier transformations to generate a Fourier transform of the surface data.

* * * * *

UNITED STATES PATENT AND TRADEMARK OFFICE
CERTIFICATE OF CORRECTION

| | | |
|---|---|---|
| PATENT NO. | : 6,987,560 B2 | Page 1 of 1 |
| APPLICATION NO. | : 10/452036 | |
| DATED | : January 17, 2006 | |
| INVENTOR(S) | : Douglas P. Morgan and William P. Geren | |

It is certified that error appears in the above-identified patent and that said Letters Patent is hereby corrected as shown below:

Title page,

Correct spelling of inventor "William P. Green" to read --William P. Geren--.

Signed and Sealed this

Eleventh Day of July, 2006

JON W. DUDAS
*Director of the United States Patent and Trademark Office*